United States Patent [19]

Patel

[11] Patent Number: 5,610,124
[45] Date of Patent: Mar. 11, 1997

[54] TIN/CERIUM COMPOUNDS FOR LIGNOSULFONATE PROCESSING

[75] Inventor: Bharat B. Patel, Bartlesville, Okla.

[73] Assignee: Phillips Petroleum Company, Bartlesville, Okla.

[21] Appl. No.: 336,610

[22] Filed: Nov. 9, 1994

Related U.S. Application Data

[62] Division of Ser. No. 981,162, Nov. 24, 1992, Pat. No. 5,401,718.

[51] Int. Cl.$^6$ ................................ C09K 7/02; C07G 1/00
[52] U.S. Cl. ............................................ 507/109; 530/506
[58] Field of Search ............................. 530/506; 507/109

[56] References Cited

U.S. PATENT DOCUMENTS

| | | | |
|---|---|---|---|
| 2,605,221 | 7/1952 | Hoeppel | 507/109 |
| 2,935,473 | 5/1960 | King et al. | 252/8.5 |
| 3,087,923 | 4/1963 | King et al. | 260/124 |
| 3,244,623 | 4/1966 | King et al. | 252/8.5 |
| 3,278,425 | 10/1966 | King et al. | 252/8.5 |
| 3,347,788 | 10/1967 | Sohn et al. | 252/8.5 |
| 4,220,585 | 9/1980 | Javora et al. | 260/124 R |
| 4,447,339 | 5/1984 | Detroit | 252/8.5 |
| 4,618,433 | 10/1986 | Allison, III | 507/109 |
| 4,728,727 | 3/1988 | Reintjes et al. | 530/500 |
| 4,755,307 | 7/1988 | Turner et al. | 252/8.514 |
| 5,226,480 | 7/1993 | Dovan et al. | 252/8.551 |

FOREIGN PATENT DOCUMENTS

| | | |
|---|---|---|
| 2365170 | 7/1975 | Germany . |
| 3637308 | 6/1988 | Germany . |

OTHER PUBLICATIONS

*Kirk–Othmer Encyclopedia of Chemical Technology*, vol. 14, John Wiley & Sons, pp. 294–312 (year not available).
*Composition and Properties of Oil Well Drilling Fluids*, 4th Ed., Gray, Darley, and Rogers, pp. 570–576, (1980).

Primary Examiner—Philip Tucker
Attorney, Agent, or Firm—Gary L. Haag

[57] ABSTRACT

This invention concerns tin-, cerium-, and base-treated tin-bearing lignosulfonates, a process for their preparation from calcium lignosulfonate, and a process for the use thereof as drilling fluid additives.

34 Claims, No Drawings

TIN/CERIUM COMPOUNDS FOR LIGNOSULFONATE PROCESSING

This application is a Division of application Ser. No. 07/981,162 filed Nov. 24, 1992, now U.S. Pat. No. 5,401,718.

FIELD OF THE INVENTION

This invention relates to tin-, cerium-, and base-treated tin-bearing lignosulfonates, a process for their preparation and a process for the use thereof as drilling fluid additives. These lignosulfonates present an alternative to the use of chrome and ferrochrome lignosulfonates which have historically received widespread use as drilling fluid additives.

BACKGROUND OF THE INVENTION

In the drilling of a well by the rotary method, a drilling fluid is often used which is generally an aqueous clay suspension and which may also contain weighting agents to increase the hydrostatic head and concentrated colloidal suspending and conditioning agents.

The drilling fluid serves to bring cuttings to the surface, to cool the bit and to keep the oil, gas and water confined to their respective formations during the drilling process. For these functions, it is necessary that the drilling fluid be of pumpable viscosity, have sufficient carrying capacity to bring cuttings to the surface, and yet be fluid enough to release cuttings and entrained gas at the surface.

A highly important property of drilling fluids, also referred to as drilling muds, is the ability to form a low permeability filter cake upon the permeable walls of the borehole, thus inhibiting the ingress of drilling fluid into the formation. Excessive fluid loss from the drilling fluid can cause severe problems. For example, the buildup of filter cake can become so thick that the drill pipe becomes stuck. Also, this buildup may cause great difficulty when withdrawing pipe from the hole. High water losses to penetrated formations can cause sloughing and caving in of shale formations. In addition, electrical logging of the well can be adversely influenced due to the mud filtrates, etc.

Drilling fluids are frequently characterized by procedures established by the American Petroleum Institute (API) for the measurement of (1) plastic viscosity, (2) yield point, (3) initial gel strength, (4) ten minute gel strength, and (5) water loss which relates to the sealing off of the penetrated formation by a filter cake. Wishing not to be bound by theory, the apparent viscosity or resistance to flow of drilling fluids is usually considered to be the result of two properties, plastic viscosity and yield point. Each of these two properties represents a different source of resistance to flow. Plastic viscosity is a property related to the concentration of solids in the fluid, whereas yield point is a property related to the interparticle forces. Gel strength, on the other hand, is a property that denotes the thixotropy of the fluid at rest. The yield point, gel strength, and in turn, the apparent viscosity of the fluid, commonly are controlled by chemical treatments with materials such as complex phosphates, alkalies, minced lignites, plant tannins, and modified lignosulfonates.

It has been found that chromium modified lignosulfonates as well as mixed metal lignosulfonates of chromium and iron are highly effective as dispersants and therefore useful in controlling the viscosity of drilling fluids and in reducing the yield point and gel strength of the drilling fluids. Because chromium is potentially toxic, its release to the natural environment and the use thereof is continuously being reviewed by various government agencies around the world. Many of these agencies are either contemplating or have enacted stringent controls concerning the use of chromium-containing compounds in oil and gas well drilling fluids.

SUMMARY OF THE INVENTION

It is an object of this invention to make in a cost effective manner a lignosulfonate which is suitable for drilling applications.

It is a further object of this invention to provide a method for making a lignosulfonate suitable for drilling applications from calcium lignosulfonate.

Yet a further object of this invention is to provide a process compatible with wood pulp processing processes for making lignosulfonates useful in drilling applications.

A still further object of this invention is to make a lignosulfonate suitable for use as a drilling fluid additive which is chrome-free.

A still yet further object of this invention is to make a lignosulfonate suitable for drilling applications which contains less chrome than commercially available chrome lignosulfonates.

In accordance with this invention, chrome-free tin-bearing and cerium-bearing lignosulfonates and means for preparing said lignosulfonates by combining a sulfate reactant comprised of tin or cerium sulfate and an aqueous solution of calcium lignosulfonate thereby producing an aqueous solution of tin or cerium lignosulfonate and calcium sulfate precipitant and separating said calcium sulfate from said aqueous solution has been discovered.

In another embodiment, tin- and cerium-bearing lignosulfonates and means for preparing said lignosulfonate by combining an aqueous solution of calcium lignosulfonate with a sulfate reactant comprising at least one sulfate salt from a first group consisting of tin sulfate and cerium sulfate and with at least one sulfate salt from a second group consisting of chrome sulfate and iron sulfate thereby producing an aqueous solution of a tin- or cerium-bearing lignosulfonate and a calcium sulfate precipitant and separating said calcium sulfate precipitant from said aqueous solution has been discovered.

In still another embodiment, the preceding processes for making lignosulfonates are used in the processing of calcium lignosulfonate-bearing streams in a wood pulp processing plant.

In still yet another embodiment, a lignosulfonate with improved drilling fluid characteristics and a means for preparing, said additive by contacting an aqueous solution of tin-bearing lignosulfonate and an alkali metal base to produce a base-treated tin-bearing lignosulfonate has been discovered.

In yet still another embodiment, a unique drilling fluid and the use of said fluid in the drilling of a well has been discovered wherein the drilling fluid is comprised of an additive containing at least one lignosulfonate selected from tin-bearing lignosulfonates, cerium-bearing lignosulfonates and base-treated tin-bearing lignosulfonates.

DETAILED DESCRIPTION OF THE INVENTION

This invention concerns novel and useful tin-bearing and cerium-bearing lignosulfonates; a means for making tin- and cerium-bearing lignosulfonates by contacting an aqueous solution of calcium lignosulfonate with a sulfate reactant comprising at least one sulfate salt selected from the group consisting of tin sulfate and cerium sulfate, and optionally, at least one sulfate from a second group consisting of iron sulfate and chrome sulfate, thereby producing an aqueous solution of tin- or cerium-bearing lignosulfonate and a calcium sulfate precipitant and separating said precipitant from the aqueous solution; and the use of tin- and cerium-bearing lignosulfonates as drilling fluid additives. This invention also concerns the use of the preceding process in wood pulp processing plants for the processing of calcium lignosulfonate-bearing streams. This invention additionally concerns a unique base-treated tin-bearing lignosulfonate drilling fluid additive, a means for preparing said additive, and the use thereof in a drilling fluid. This additive is prepared by contacting an aqueous solution of tin-bearing lignosulfonate with an alkali metal base thereby producing a base-treated tin-bearing lignosulfonate. When this lignosulfonate is added to an aqueous drilling fluid comprised of clayey materials, the yield point and gel strengths are unexpectedly reduced while other drilling fluid properties remained acceptable.

In the wood pulping industry, large quantities of calcium lignosulfonate are produced when separating cellulose from lignin by the dissolution of the lignin via reaction with calcium disulfide at elevated temperatures and pressures. The aqueous calcium lignosulfonate solution may then be treated to remove various impurities such as solubilized sugars. Representative data for a calcium lignosulfonate marketed by Lignotech under the tradename Norlig A is presented in Table I. Calcium lignosulfonates are available in either liquid or solid form.

TABLE I

Typical Analysis of Norlig A Calcium Lignosulfonate

| Chemical Data | Physical Data | |
|---|---|---|
| 3.0 pH | Color: | Brown |
| 0.1 wt % Sodium | | |
| 4.0 wt % Calcium | Powder: | 5.0 wt % Moisture |
| 0.5 wt % Sulphate Sulpur | | 36 lbs/ft$^3$ Bulk Density |
| 0.6 wt % Nonsulphonate Sulphur | | |
| 5.0 wt % Sulphonate Sulfur | Liquid: | 50 or 58% Solids |
| 5.6 wt % Total Sulphur | | 5.19 or 6.23 lbs. solids/gal |
| 8.9 wt % Methoxyl | | concentration at 25° C. |
| 15.7 wt % Reducing Sugars | | 70 to 450 cps Viscosity 25° C. |

Although uses for calcium lignosulfonate are limited, other uses are made possible by base exchanging the calcium cation with another ion.

In the inventive process of interest, the cation exchange occurs by an operationally simple process which is generally compatible with the process technologies existing in calcium lignosulfonate-producing wood pulp processing plants. In the inventive process, the cation-exchanged lignosulfonates of interest are prepared by contacting an aqueous calcium lignosulfonate with at least one sulfate salt selected from the group consisting of tin sulfate and cerium sulfate. Tin is the most preferred sulfate salt. Optionally, the sulfate salt can additionally be comprised of at least one sulfate salt selected from a second sulfate group consisting of iron sulfate and chrome sulfate. Because of environmental considerations, iron sulfate is most preferred. As used herein, iron sulfate refers to both iron (II) sulfate and iron (III) sulfate. Of these two sulfates, iron (II) sulfate is the most preferred. The sulfate salts can be added concurrently or serially. Preferably, the sulfate salt from the first group is added and thoroughly mixed with the aqueous reaction medium prior to the addition and thorough mixing of the sulfate salt from the second group. The preceding steps produce an aqueous cation-exchanged lignosulfonate and a calcium sulfate precipitant which are then separated.

The contacting step can be conducted in any manner which insures intimate mixing of the reactants and includes any of the many means available to one possessing ordinary skill in the art. The means of contacting include, but are not limited to, the use of static mixers or stirred tank reactors operated in either a batch or continuous flow manner. Stirred tank reactors are the most preferred means of contacting the liquid and solid phases.

Similarly, the means of liquid-solid separation includes any of the many processes available to one possessing ordinary skill in the art. The separation means include, but are not limited to, processes using the principles of centrifugation, filtration, and sedimentation or settling. The use of filtration devices and centrifuges is preferred. Because of frequent usage in the pulping industry, separation using a filtration device such as a rotary vacuum filter is most preferred.

The minimum amount of sulfate salt required in the cation-exchanged reaction is that amount effective to precipitate some calcium sulfate. The preferred mole ratio of sulfate salt to calcium in the calcium lignosulfonate is 0.1:1 to 1.5:1 and a mole ratio of about 0.25:1 to shout 1.25:1 is more preferred. The most preferred mole ratio is about 1.0:1.

When using sulfate salts comprising a first sulfate group consisting of tin sulfate and cerium sulfate and a second sulfate group consisting of iron sulfate and chrome sulfate, the preferred mole ratio range of the first group to the second group is 1:19 to 19:1 and the most preferred range is about 1:19 to about 1:1.

The preferred concentration of total solids in the aqueous calcium lignosulfonate is 10 to 70 wt %. A total solids concentration of about 30 to about 60 wt % dissolved solids is more preferred. The most preferred concentration range of dissolved calcium lignosulfonate in the aqueous calcium lignosulfonate is about 43 to about 47 wt %. The most preferred concentration is about 45 wt. %.

The contacting and separation steps are conducted at a temperature effective to insure sufficient fluidity of the liquid for intimate fluid mixing and efficient solid/liquid separation. A temperature of about 70° F. to about 212° F. is preferred and a temperature of about 125° F. to about 212° F. is more preferred. The most preferred process temperature range is about 190° to about 210° F. The most preferred temperature is about 200° F.

The aqueous cation-exchanged lignosulfonate can optionally be dried to produce a solid lignosulfonate product using any of the many evaporation and drying techniques available to one possessing ordinary skill in the art. Methods of drying include, but are not limited to, the use of tray dryers, screw-conveyor dryers, rotary dryers, screw-conveyor dryers, tower dryers, flash dryers, drum dryers, and spray dryers or any combination of the preceding. The preferred means of drying are drum drying and spray drying. The drying step may additionally be comprised of an initial evaporation step to remove excess water prior to introduction of the aqueous cation-exchanged lignosulfonate to one of the drying processes.

In another aspect of this invention, the use of tin- or cerium-bearing lignosulfonates as drilling fluid additives has been found to impart excellent performance characteristics to drilling fluids. Furthermore, when the tin-bearing lignosulfonate is treated by contacting with an alkali metal base, a drilling fluid additive possessing unique and superior properties is obtained. These performance characteristics are discussed in Example II. The most preferred tin-bearing lignosulfonate for this embodiment of the invention is the lignosulfate obtained using tin sulfate as the sole cation source in the lignosulfonate cation exchange reaction (whereby a tin lignosulfonate is produced).

The alkali metal base used in the treatment of tin-bearing lignosulfonate can be any compound possessing a cation from the alkali metal (Group I) series and an anion capable of accepting or receiving a proton from another substance. Sodium and potassium bases are more preferred and most preferred are the sodium bases. The most preferred sodium base is sodium hydroxide.

The base-treated tin-bearing lignosulfonate is prepared by contacting aqueous tin-bearing lignosulfonate, preferably prepared by the process described herein, with an alkali metal base. The tin-bearing lignosulfonate and the alkali metal base are intimately contacted by any means readily available to one possessing ordinary skill in the art. Means of contacting include, but are not limited to, static mixers and stirred tank reactors operated in either batch or continuous mode. A stirred tank reactor is preferred.

The amount of alkali metal base used is an amount effective to produce a base-treated tin-bearing lignosulfonate with acceptable yield point and gel strength properties when added to a drilling mud. The mole ratio of alkali metal base to tin in the aqueous tin-bearing lignosulfonate is preferably 0.1:1 to 10:1 and more preferably about 1.0:1 to about 7:1. A process temperature effective to insure sufficient fluidity of the reactants for intimate reactant mixing is required. A temperature of 70° F. to 212° F. is preferred; more preferred is a temperature of about 125° F. to about 212° F.; and most preferred is a temperature range of about 190° F. to about 210° F. The most preferred temperature is about 200° F. The preferred concentration of total solids in the aqueous tin lignosulfonate is 10 to 70 wt %; the more preferred concentration is about 30 to about 60 wt %; and the most preferred concentration range is about 43 to about 47 wt.%. The most preferred concentration is about 45 wt %.

The base-treated tin-bearing lignosulfonate may additionally be dried to produce a solid base-treated tin-bearing lignosulfonate using any of the many drying technologies available to one possessing ordinary skill in the art. The drying step may include an evaporation step to further concentrate the base-treated tin-bearing lignosulfonate prior to drying. The drying step specifically includes, but is not limited to, drying processes using a drum dryer, a screw dryer, a screw-conveyor, a tower dryer, a flash dryer, a spray dryer or any combination of the preceding. The preferred means of drying are drum drying and spray drying.

In a water-based drilling fluid, the amount of lignosulfonate present in the fluid can vary appreciably depending on various parameters such as hardness, temperature, weighting materials, the clayey mineral, and other additives. The tin-bearing, cerium-bearing, or base-treated tin-bearing lignosulfonate should be present in an amount effective to disperse the clayey material of interest. For a fluid containing approximately 6 to about 15 lb/bbl of clayey mineral such as bentonite, attapulgite, sepiolite and hectorite, the lignosulfonate is preferably present in the range of about 0.25 to about 10 lb/bbl of mud composition and more preferably in the range of about 1 to about 6 lb/bbl of mud. The preceding assumes 42 gallons per barrel.

In actual operation, the lignosulfonate can be added separately to the drilling fluid before or after other drilling fluid additives, or added as part of an additive package. Such an additive package can contain suspending agents, conditioning agents, viscosifiers, thinners, oxygen scavengers, corrosion inhibitors, bactericides and other additives commonly used by those possessing ordinary skill in the art. The lignosulfonate of this invention is suitable for use in fresh water, sea water, salt water, brackish water, and hard brine environments. The term "brine" is intended to include any aqueous solution of mineral salt having greater than 10,000 ppm dissolved solids. Such conditions frequently exist in oilfield fluids. Oilfields brines commonly contain varying amounts of sodium chloride, calcium chloride and magnesium salts.

The drilling fluids of this invention are preferably comprised of an aqueous composition containing an effective amount of clayey material, the inventive lignosulfonate, preferably base-treated tin-bearing lignosulfonate, more preferably sodium hydroxide base-treated tin lignosulfonate, and optionally weighting, suspending, conditioning, and viscosifying agents. Additives such as oxygen scavengers and corrosion inhibitors, bactericides, thinners, and other additives commonly used by those possessing ordinary skill in the art can also be added to the aqueous solution.

Another inventive aspect of this invention is a method of drilling a well comprising circulating in a well one of the inventive drilling fluids previously described. Utilizing the well drilling fluid of this invention, a well is drilled by rotating a hollow drill stem having a drill bit attached thereto to form a borehole and the drilling fluid is circulated in the well down through the drill stem out the bit and upward to deposit a filter cake on the walls of the borehole and carry cuttings to the surface.

The following examples serve to further illustrate the invention.

EXAMPLE I

This example concerns the preparation of metal lignosulfonates from calcium lignosulfonate.

The metal lignosulfonates were prepared by converting a calcium lignosulfonate (Norlig A 58%) to the corresponding metal lignosulfonate. The procedure consisted of adding 50 grams of Norlig A to 22.5 grams distilled water. The mixture was then heated and stirred until the temperature reached 140° F. If the overall reaction involved the addition of only one reactant species, the reactant was added and the resulting mixture was continuously stirred and maintained at 140°–150° F. for 1½ hours. If a second reactant was added, the mixture bearing the first reactant species was continuously stirred and maintained at 140°–150° F. for 30 minutes followed by the addition of the second reactant species whereupon the mixture was stirred and maintained at 140°–150° F. for an additional 1½ hours.

The samples were then immediately filtered using standard API water loss equipment at a 100 psi pressure at a temperature of approximately 140° F. The filtrate was then oven dried at approximately 225° F. with occasional stirring until a suitable product was obtained. In situations where the filtration results were poor or very slow, both the filtrate and the unfiltered material were dried. The water loss characteristics for twelve different metal lignosulfonates are presented in Table II.

The comparative solid/liquid separation data in Table II clearly establishes that on the basis of lignosulfonate/calcium sulfate separation, the cerium and tin sulfate reactants are preferred over and clearly superior to the other reactants studied which included iron sulfate, chromium oxide, sodium sulfate and mixtures of tin sulfate and either iron sulfate, zinc sulfate or tin chloride. The tin/iron lignosulfonate results are superior to the chrome/iron lignosulfonate results.

TABLE II

| Sample No. | Reactant #1 | Amount | Reactant #2 | Amount | Recovered Filtrate (ml) 0.5 min | 1.0 min | 30 min | Minutes to Recover 34 ml Filtrate |
|---|---|---|---|---|---|---|---|---|
| 1 | — | — | — | — | 13.0 | 16.0 | — | 22.0 |
| 2 | $Ce(SO_4)_2$ | 9.0 | — | — | >50.0 | — | — | <0.5 |
| 3 | $SnSO_4$ | 6.0 | — | — | 24.0 | 40.0 | — | <1.0 |
| 4 | $SnSO_4$ | 12.0 | — | — | 22.0 | 34.0 | — | 1.0 |
| 5 | $SnSO_4$ | 3.0 | $FeSO_4$ | 9.0 | 9.5 | 12.5 | — | 11.0 |
| 6 | $SnSO_4$ | 3.0 | $FeSO_4$ | 9.0 | 7.0 | 12.0 | — | 12.0 |
| 7 | $SnSO_4$ | 3.0 | $ZnSO_4$ | 9.0 | 1.0 | 1.5 | 4.0 | >30.0 |
| 8 | $SnSO_4$ | 3.0 | $SnCl_2 \cdot 2H_2O$ | 9.0 | 2.0 | 3.0 | 6.0 | >30.0 |
| 9 | $FeSO_4$ | 9.0 | — | — | 4.0 | 5.0 | 7.0 | >30.0 |
| 10 | $Cr_2O_3$ | 3.0 | $FeSO_4$ | 9.0 | 3.5 | 5.0 | 18.0 | >30.0 |
| 11 | $Na_2SO_4$ | 9.0 | — | — | 6.0 | 7.0 | 8.0 | >30.0 |
| 12 | $SnSO_4$ | 6.0 | NaOH[a] | 4.0 | 8.0 | 15 | NR | NR |

[a]After treatment with reactant #1, the mixture was filtered. The filtrate was reheated to 140° F. to evaporate some water and then reactant #2 was added whereupon an exothermic reaction was noted. The mixture was stirred and maintained at 140–160° F. for 1.5 hours and then dried.
NR — Not Reported

EXAMPLE II

This example concerns the performance characteristics of the metal lignosulfonates of Example I when incorporated into a representative drilling mud.

The base mud recipe consisted of 47 grams bentonite, 235 grams of P95 illite clay (represents drill solids) and 560 grams of barite per 1,000 mL of tap water. To each sample which initially consisted of 280 mL (412.2 grams) of the above mud was added 1.6 grams (i.e., 2.0 pounds per barrel equivalent) of test material. The mixture was then stirred for 20 minutes during which time 0.50 mL of 50% wt/vol sodium hydroxide solution was added. The samples were tested immediately and then aged for sixteen hours at 150° F. whereafter they were cooled to room temperature (77° F.) and mixed for ten minutes prior to testing. Representative data for (1) a base fluid or mud, (2) a mud containing the lignosulfonates of Table II, (3) and a mud containing a commerically available ferrochrome lignosulfonate (Sample A) are presented in Table III. The tests were conducted using API procedure RF 13B.

Referring to Table III, the cerium lignosulfonate (Sample 2) one tin lignosulfonate (Samples 3 and 4), and the tin/iron lignosulfonate (sample 5) muds exhibit performance characteristics similar to or in some instances superior to the mud prepared using commercially available ferrochrome lignosulfonate (Sample A). The base-treated tin lignosulfonate mud (Sample 12) also possesses a similar plastic viscosity, both before and after aging, as the mud containing the commercially available ferrochrome lignosulfonate (Sample A). However, the yield point and the gel strengths at 10 seconds and 10 minutes for the base-treated tin lignosulfonate mud, both before and after aging, possess the desirable property of being lower than the corresponding values for the mud containing the ferrochrome lignosulfonate (Sample A).

TABLE III[a,b]

| | Before Aging | | | | | After Aging | | | | |
|---|---|---|---|---|---|---|---|---|---|---|
| Sample | Yield Point ($lb_f$/100 $ft^2$) | Plastic Viscosity (cp) | Gel Strength ($lb_f$/100 $ft^2$) 10 s | 10 min | RPM 300/600 | Yield Point ($lb_f$/100 $ft^2$) | Plastic Viscosity (cp) | Gel Strength ($lb_f$/100 $ft^2$) 10 s | 10 min | RPM 300/600 |
| Base Mud | 20 | 26 | 25 | 77 | 72/46 | 21 | 29 | 7 | 32 | 79/50 |
| 1 | 29 | 19 | 53 | 100 | 67/48 | 20 | 21 | 27 | 49 | 62/41 |
| 2 | 11 | 24 | 29 | 67 | 59/35 | 21 | 20 | 26 | 50 | 61/41 |
| 3 | 17 | 23 | 27 | 67 | 63/40 | 16 | 22 | 15 | 45 | 60/38 |
| 4 | 15 | 22 | 14 | 95 | 59/37 | 12 | 19 | 3 | 42 | 50/31 |
| 5 | 13 | 20 | 11 | 54 | 53/33 | 11 | 19 | 7 | 38 | 49/30 |
| 6 | — | — | — | — | — | — | — | — | — | — |
| 7 | 86 | 10 | 160 | 205 | 106/96 | 36 | 17 | 48 | 91 | 70/53 |
| 8 | — | — | — | — | — | — | — | — | — | — |
| 9 | 15 | 18 | 14 | 57 | 51/33 | 14 | 19 | 15 | 43 | 52/33 |
| 10 | 10 | 21 | 4 | 32 | 52/31 | 12 | 19 | 5 | 30 | 50/31 |
| 11 | 47 | 19 | 72 | 110 | 85/66 | 28 | 20 | 40 | 64 | 68/48 |
| 12 | 4 | 20 | 2 | 27 | 44/24 | 3 | 21 | 1 | 3 | 45/24 |
| A[c] | 16 | 20 | 9 | 48 | 56/36 | 24 | 20 | 17 | 42 | 64/44 |

[a]Tests conducted according to API RF 13B, Eleventh Ed., May 1, 1985.
[b]Samples and sample numbers are the same as Example I.
[c]Comparative data using a commercially available chrome lignosulfonate (Q-Broxin sold by Baroid, Corp., Houston, TX).

That which is claimed is:

1. A process for making tin- or cerium-bearing lignosulfonates comprising the steps of:
   (a) contacting an aqueous calcium lignosulfonate and a sulfate reactant comprising at least one sulfate salt selected from the sulfate group consisting of tin sulfate and cerium sulfate to produce an aqueous product lignosulfonate and a calcium sulfate precipitant; and (b) separating said precipitant from said aqueous product lignosulfonate.

2. A process according to claim 1 wherein said sulfate reactant is additionally comprised of at least one sulfate salt selected from a second sulfate group consisting of iron sulfate and chrome sulfate.

3. A process according to claim 2 wherein the mole ratio of the first sulfate group to the second sulfate group is 1:19 to 19:1.

4. A process according to claim 2 wherein the mole ratio of the first sulfate group to the second sulfate group is about 1:19 to about 1:1.

5. The process according to claim 1 wherein said sulfate salt is present in an amount effective for separation of said calcium sulfate precipitant from said aqueous product lignosulfonate.

6. A process according to claim 1 wherein the mole ratio of sulfate salt to calcium in the calcium lignosulfonate is 0.1:1 to 1.5:1.

7. A process according to claim 1 wherein the mole ratio of sulfate salt to calcium in the calcium lignosulfonate is about 0.25:1 to about 1.25:1.

8. A process according to claim 1 wherein said contacting and said separating steps are conducted at a temperature of about 70° F. to about 212° F.

9. A process according to claim 1 wherein said contacting and said separating steps are conducted at a temperature of about 125° F. to about 212° F.

10. A process according to claim 1 wherein said aqueous calcium lignosulfonate contains 10 to 70 weight percent total solids.

11. A process according to claim 1 wherein said contacting step is done with a stirred tank reactor.

12. A process according to claim 1 wherein said separation step is done using a filtration device or centrifuge.

13. A process according to claim 1 further comprising the step of
   (c) drying said aqueous product lignosulfonate to produce a solid tin- or cerium-bearing lignosulfonate.

14. A process according to claim 1 wherein said sulfate is tin sulfate.

15. A process according to claim 1 wherein said sulfate salt is cerium sulfate.

16. A process for making tin lignosulfonate comprising the steps of:
   (a) contacting an aqueous calcium lignosulfonate containing 10 to 70 weight percent total solids and tin sulfate in a stirred tank reactor at a temperature of about 70° F. to about 212° F. to produce an aqueous tin lignosulfonate and a calcium sulfate precipitant; and
   (b) separating said precipitant from said aqueous tin lignosulfonate using a filtration device or centrifuge.

17. A process according to claim 16 further comprising the step of:
   (c) drying the aqueous tin lignosulfonate to produce a solid tin lignosulfonate.

18. A process for making a base-treated tin-bearing lignosulfonate comprising the steps of:
   (a) contacting aqueous calcium lignosulfonate and a sulfate reactant comprising tin sulfate to produce an aqueous tin-bearing lignosulfonate and a calcium sulfate precipitant;
   (b) separating said calcium sulfate precipitant from said aqueous tin-bearing lignosulfonate; and
   (c) contacting said aqueous tin-bearing lignosulfonate and an alkali metal base to produce a base-treated tin-bearing lignosulfonate.

19. A process according to claim 18 wherein the mole ratio of alkali metal base to tin in the tin-bearing lignosulfonate is 0.1:1 to 10.0:1.

20. A process according to claim 18 wherein the mole ratio of alkali metal base to tin in the tin-bearing lignosulfonate is about 1.0:1 to about 7:1.

21. A process according to claim 18 wherein the steps are conducted at a process temperature of about 70° F. to about 212° F.

22. A process according to claim 18 wherein said aqueous lignosulfonate contains 10 to 70 weight percent total solids.

23. A process according to claim 18 additionally comprising the step of:
   (d) drying said base-treated tin-bearing lignosulfonate to produce a solid base-treated tin-bearing lignosulfonate.

24. A process according to claim 18 wherein said alkali metal base is sodium hydroxide.

25. A process according to claim 23 wherein said alkali metal base is sodium hydroxide.

26. A composition of matter prepared according to the process of claim 1.

27. A composition of matter prepared according to the process of claim 2.

28. A composition of matter prepared according to the process of claim 13.

29. A composition of matter prepared according to the process of claim 18.

30. A composition of matter prepared according to the process of claim 23.

31. A composition of matter prepared according to the process of claim 24.

32. A composition of matter prepared according to the process of claim 25.

33. A composition of matter prepared according to the process of claim 16.

34. A composition of matter prepared according to the process of claim 17.

* * * * *